Feb. 11, 1958 K. SCHLESINGER ET AL 2,823,258

TELEVISION DOT SCANNING SYSTEM

Filed March 7, 1951 4 Sheets-Sheet 1

INVENTORS
Kurt Schlesinger
Victor Graziano
BY Foorman L. Mueller
Atty.

INVENTORS
Kurt Schlesinger
Victor Graziano
BY
Foorman L. Mueller
Atty.

INVENTORS
Kurt Schlesinger
Victor Graziano
BY Foorman L. Mueller
Atty.

TELEVISION DOT SCANNING SYSTEM

Filed March 7, 1951 4 Sheets-Sheet 4

INVENTORS
Kurt Schlesinger
Victor Graziano
BY
Foorman L. Mueller
Atty.

United States Patent Office 2,823,258

Patented Feb. 11, 1958

2,823,258

TELEVISION DOT SCANNING SYSTEM

Kurt Schlesinger, Maywood, and Victor Graziano, Oak Park, Ill., assignors to Motorola, Inc., Chicago, Ill., a corporation of Illinois Application March 7, 1951, Serial No. 214,314

6 Claims. (Cl. 178—7.5)

This invention relates generally to television systems and more particularly to such systems in which the velocity of the horizontal scanning motion and/or the intensity of the beam are modulated to control the light distribution along the horizontal lines.

Television systems have been disclosed in which various different scanning systems have been proposed for providing deflection patterns by which an image may be reproduced. Present monochrome standards provides for scanning by use of 525 horizontal lines which are interlaced in two fields each of which includes 252½ lines. These fields are reproduced 60 times per second so that a complete picture is provided 30 times per second. The use of interlaced horizontal lines has been proven to greatly improve picture definition and it has likewise been proposed to further improve definition by replacing the continuous horizontal lines by a plurality of interlaced dots. This has been proposed particularly for color television wherein it is necessary to fully utilize a given bandwidth, but is also effective in monochrome television to increase the definition of the image which may be transmitted over a particular band.

In my prior application, Serial No. 189,731, filed October 12, 1950, subject, Television System, a system is disclosed in which the reproduced picture is made up of non-continuous substantially stationary dots. This is achieved by causing the beam to scan the screen horizontally at alternately slow and fast velocities, with the beam being gated so that it is displayed only during the slow movement. The present invention relates to improvements in such systems in which definition is improved by the use of a third dimension of scanning, and relates both to the equipment used and to the processes practiced to provide a bright high definition picture.

It is one object of the present invention to provide an improved television scanning system in which fine detail of a picture is accurately reproduced by the display of a plurality of substantially stationary dots.

Another object of this invention is to provide an improved dot arresting television scanning system by which picture reproduction having optimum definition and brightness is accomplished in a relatively simple circuit.

A further object of this invention is to provide an improved scanning system wherein dots are provided when fine detail is to be reproduced to, in effect, etch the portion of the screen on which the detail is shown, and the dots are wiped off the screen when the picture being reproduced has only coarse detail.

A still further object of this invention is to provide a dot pattern scanning system in which the velocity of horizontal movement of the beam and the intensity thereof are controlled in a coordinated manner to selectively produce separate dots or a continuous horizontal line depending upon the characteristics of the video signal being reproduced.

A feature of this invention is the provision of a television system in which the horizontal deflection of the beam takes place at alternately fast and slow velocities with the intensity of the beam being controlled to be maximum when the velocity is minimum.

Another feature of this invention is the provision of a television receiver including a reproducing picture tube having an electrode to which the video signal is applied and including deflection means for causing the beam of the tube to scan a screen at alternately fast and slow velocities with the tube having a second electrode for controlling the intensity of the beam and means for providing a voltage to the second electrode so that the intensity variations thereof are coordinated with the velocity characteristics of the scanning.

A further feature of this invention is the provision of a dot arresting television system in which the horizontal deflection field has a linear component and a sinusoidal arresting component, and in which the intensity of the beam is also controlled in accordance with sinusoidal voltage waves of the same frequency as the arresting component. The phase of the voltage waves may be controlled to selectively counteract the effect of the arrested deflection, or alternatively to cause further concentration of the light distribution produced by the arrested deflection.

A still further feature of this invention is the provision of a dot arresting system in which the arresting is produced by a wave including the fundamental and second harmonic to thereby simulate a sawtooth wave, with the arresting wave having a portion of opposite slope to the standard scan to stop the beam for relatively long time intervals.

Still another feature of this invention is the provision of a television scanning system in which dots are provided for producing increased definition, with the dots being eliminated in areas of little detail, and sensing means responsive to the video signal for controlling the dot producing means.

Further objects and features, and the attending advantages of the invention will be apparent from a consideration of the following description when taken in connection with the accompanying drawings in which.

In practicing the invention there is provided a television system including a cathode ray tube having means for producing an electron beam which includes a cathode and a control grid. The video signal is applied to the cathode of the tube for modulating the beam. In addition to the usual linear horizontal deflection field, an arresting field is provided, varying at a rate much faster than the horizontal scanning frequency, which modulates the horizontal deflection so that the beam in effect moves alternately fast and slow. By applying a voltage wave to the grid of the tube which leads the arresting wave, the intensity of the beam is decreased during the fast movement thereof, and increased during the slow movement thereof, so that the beam in effect forms a plurality of arrested dots. By reversing the polarity of the voltage applied to the grid, the beam can be made to have minimum intensity during the slow movement and maximum intensity during the fast movement so that the light distribution is substantially uniform.

The phase of the wave applied to the grid may be controlled by a sensing unit operating from the video signal to selectively cause dots to be produced and thereby effectively etch the screen when the signal indicates fine detail, and to wipe the dots when little detail is present. Still greater light intensity may be provided by the use of a simulated sawtooth wave in the arrestor field, which wave may be simply formed by combining a fundamental sine wave with a second harmonic having an amplitude one-third that of the fundamental. By using such an arresting wave, the movement of the beam can be completely stopped for a time which depends upon the characteristics of the sawtooth wave. Such a wave may also be gated or wiped as desired.

Figure 1:
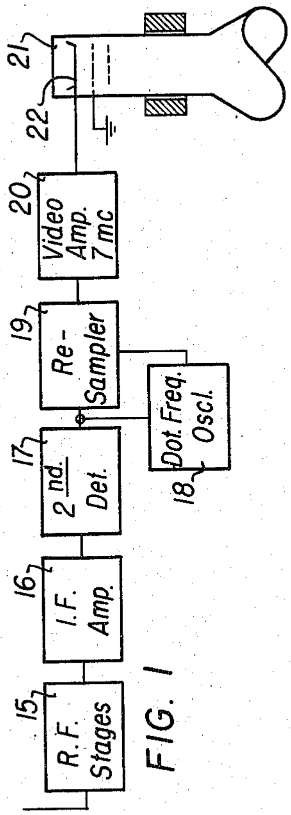
Fig. 1 is a block diagram of a dot interlace television system using a synchronous detector for sampling.

Referring now to the drawings, in Fig. 1 there is illustrated in block diagram form a dot interlace television system in which a synchronous detector is used to provide sampling to extend the effective band of the video signal. This receiver includes radio frequency amplifier stages 15, an intermediate frequency amplifier 16, second detector 17, a dot frequency oscillator 18, resampler 19, video amplifier 20 and television picture tube 21. The dot frequency oscillator 18 is synchronized with a sampling wave included as part of the video signal to provide a third dimension of synchronization, and controls the resampler 19 which is a synchronous detector, to extend the band of the video signal. The wide band video signal is applied from the amplifier 20 to the cathode 22 of the picture reproducing tube 21. This system is considerably more expensive than present standard television systems in that the dot frequency oscillator and resampler are required in addition to the normal equipment, and the video amplifier 20 must pass a wide band and therefore must be of much more expensive construction than usual amplifiers for a band of only four megacycles.

Figure 2:
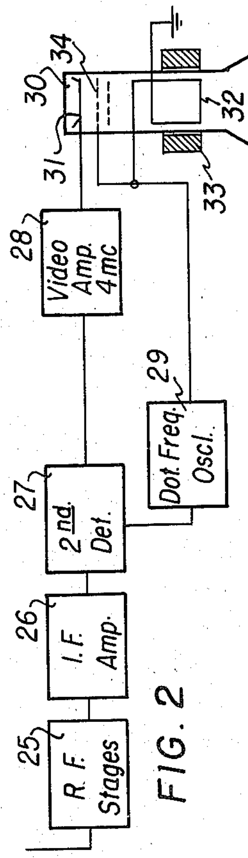
Fig. 2 is a block diagram of a dot arresting television system in accordance with the invention.

In Fig. 2 there is illustrated in block diagram form the dot arresting television system in accordance with the invention. This receiver includes radio frequency stages 25, intermediate frequency amplifier 26, second detector 27, video amplifier 28, dot frequency oscillator 29 and the picture reproducing tube 30. In this receiver the radio frequency stages, intermediate frequency amplifier, second detector and video amplifier may all be standard components such as used in present television receiver systems. The output of the video amplifier is applied to the cathode 31 of the picture reproducing tube in accordance with standard practice. The dot frequency oscillator is synchronized by a sampling wave provided in the video signal and produces a current wave of sine wave form in the arrestor coil 32. The arrestor coil may be a very small coil having only three turns or so which can be provided by printing a conductor on an insulating sheet. This coil may be placed under the usual scanning yoke indicated at 33. It will be apparent that the sine wave current in the arrestor coil 32 will produce a cosine voltage wave across this coil which may be applied to the grid 34 for gating the beam.

Figure 3:
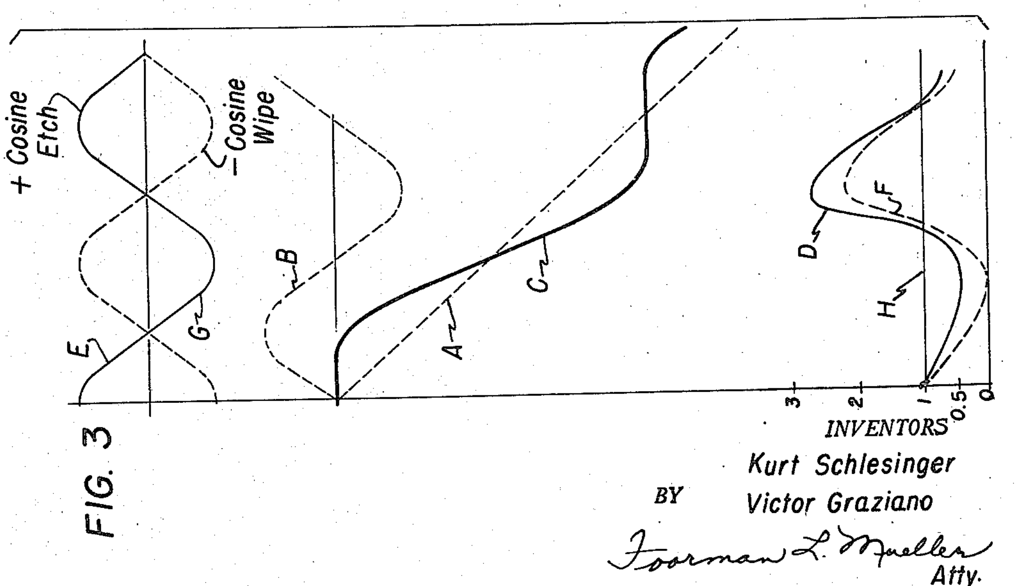
Fig. 3 is a plurality of curves illustrating the operation of the system of Fig. 2.

In Fig. 3 there is shown curves which illustrate the operation of the dot arresting system in accordance with the invention. Curve A indicates the normal linear scanning trace, curve B the field produced by the arrestor coil, and curve C the composite deflection movement. This deflection movement, without any gating of the beam, results in a light distribution pattern as indicated by curve D. Because of the finite size of the beam, the position in space of maximum intensity comes ahead of the position of slow movement, as is shown by comparing the peak of curve D with the horizontal portions of curve C.

By gating the beam which moves in an arrested manner as shown by the curve C, by a wave E which is a cosine wave and therefore leads the arresting sine wave B, the interdot light is removed and the resolution is improved as is indicated by the dotted curve F. By reversing the phase of the gating wave, the light concentrating effect of the arrested scanning is counteracted and the light distribution is made substantially uniform. This action will be produced by the minus cosine wave G shown by dotted lines, with the curve H showing uniform light intensity at a unity level. This action in effect removes the dots from the screen and may be used to produce very desirable results as will be further explained.

Figure 4:
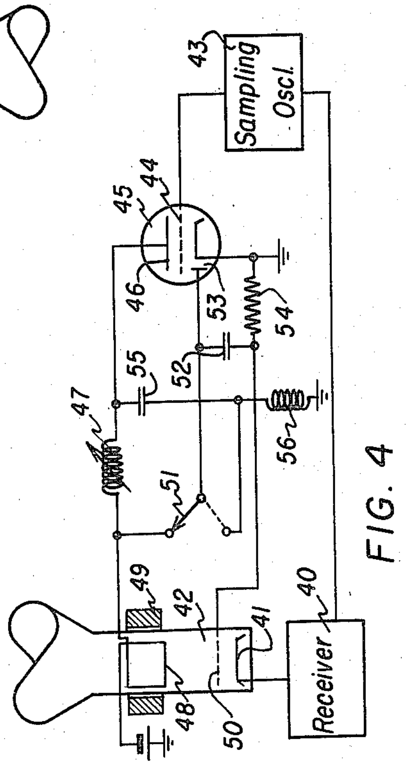
Fig. 4 is a simplified circuit diagram illustrating the basic system of the invention.

Referring now to Fig. 4 of the drawings, in this figure a very simple system is illustrated for practicing the invention. Signals are received by the receiver 40 and are applied to the cathode 41 of the cathode ray reproducing tube 42. The system is adapted to operate from a television signal including the standard composite video signal having picture elements and horizontal and vertical synchronization elements, and in addition a third synchronization signal or sampling wave which provides a third dimension of scanning. This sampling wave may be at a frequency of 3.72 megacycles and may control an oscillator 43 which operates at twice this frequency or 7.44 megacycles. The sampling oscillator 43 may be a simple oscillator producing a sine wave output. This output is applied to the grid 44 of the triode tube 45, the plate 46 of which is connected through inductor 47 to the arrestor coil 48. The tube 45 therefore provides a current of sine wave form in the arrestor yoke 48. The standard deflection yoke 49 for producing linear deflection is shown only schematically. The benefits resulting from arrested scanning as indicated by light distribution curve D of Fig. 3 may be provided with only these elements which have now been described.

As stated with respect to Fig. 3, it may be desired to gate the wave to further increase the sampling merit. The beam of the tube may be gated by applying to the grid 50 thereof a positive cosine wave as illustrated in curve E of Fig. 3. Such a voltage wave may be readily produced in the system of Fig. 2 by coupling the grid 50 to the voltage across the coil 48. This coupling is provided through switch 51, condenser 52, diode 53 and resistor 54. The diode 53 keeps the peaks of the gating wave at ground potential. The positive cosine wave when applied to the tube for gating the beam, provides a concentrated light distribution as indicated by curve F of Fig. 1. In order to provide a negative cosine wave as indicated by curve G (Fig. 3), condenser 55 and inductor 56 are provided. The voltage across inductor 56 may be provided through switch 51 for wiping the dots from the screen. Therefore when the switch 51 is in the position shown by the dotted line, a negative cosine wiping wave is applied which renders the light intensity uniform as indicated by the curve H of Fig. 1. It is to be pointed out that the switch 51 is not to be limited to a mechanical switch as shown but may be a fast acting electronic switch for changing the operation of the system in accordance with the detail of the picture received as will be described more in detail.

Figure 5:
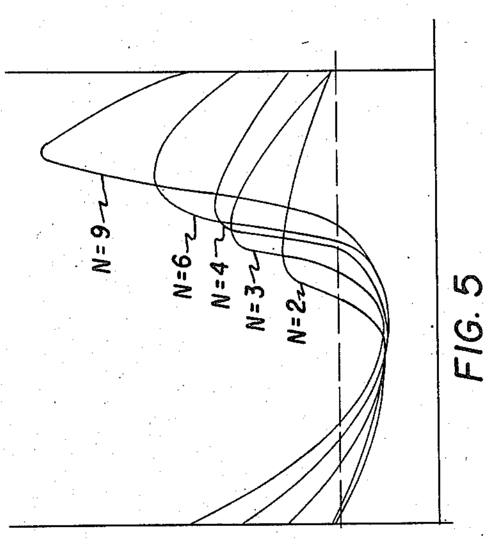
Fig. 5 is a family of curves showing light distribution for various dot indeces.

The light distribution resulting from dot arresting, as shown by curve D of Fig. 3, depends in shape upon the ratio of the dot spacing to the dot size. That is, the ratio of the distance between the same point on successive arresting cycles, with respect to the width of the spot produced on the screen by the cathode ray beam. In Fig. 5 there is illustrated a family of curves in which this ratio which is indicated as N varies through values between 2 and 9. For monochrome reproduction on standard tubes the spot size and spacing is such that this ratio is only of the order of two. However, by tube design this could be increased. For color television in which various color fields are interlaced the ratio will be higher and may be 4 or more. Curve D of Fig. 3 is drawn for a dot ratio of the order of 4 and the curves in Fig. 7 which will be described more in detail are also drawn for ratios of the order of 4.

Figure 6:
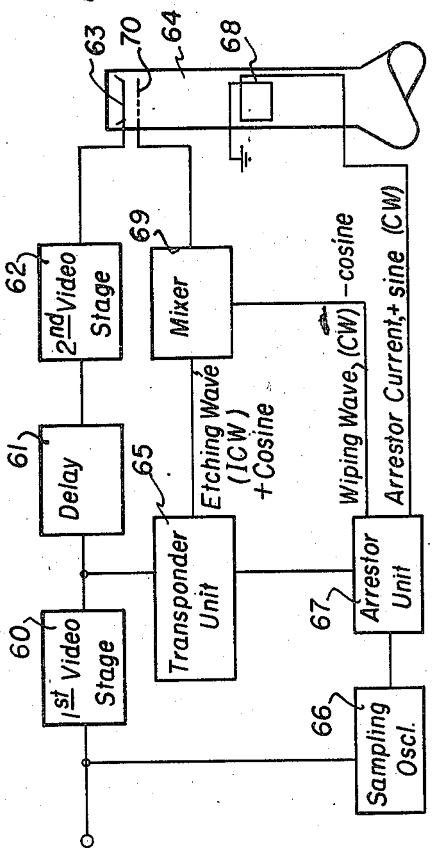
Fig. 6 is a block diagram of one embodiment of the invention.

In Fig. 6 there is illustrated in block diagram form a more complete system in accordance with the invention. The received composite video signal is applied to a video amplifier 60 which is connected through a delay line 61 and amplifier 62 to the cathode 63 of the reproducing tube 64. The output of the video amplifier 60 is also applied to a detail senser or transponder unit 65. The video signal is also applied to a sampling oscillator 66 which may operate at a frequency of the order of 7.44 megacycles and may be synchronized by a sampling wave at 3.72 megacycles which is received as part of the video signal. The sampling oscillator 66 drives an arrestor unit 67 which produces a sine wave of current in the arrestor coil 68. A voltage wave may also be developed by the arrestor unit 67 and may be applied through mixer 69 to the grid 70 of the tube 64. This voltage wave is a wiping wave to render the light distribution of the beam substantially uniform across the horizontal scan.

The transponder unit 24 is a device for detecting the presence of high frequency variations in the video signal which indicate fine detail in the reproduced picture. This unit provides a gating wave when the video signal includes such high frequency components. This gating wave is of opposite phase to the wiping wave and has an amplitude at least twice that of the wiping wave. The mixer 69 combines the gating wave with the wiping wave and applies the resultant wave to the grid 27 of the tube 23. This resultant wave is of the same phase as the gating wave and therefore acts to gate the beam and provide the etching effect when detail is present.

Considering now the operation of the system described in Fig. 6, the video signal is applied to the cathode 63 to modulate the beam. The beam is deflected in the normal manner and in addition is deflected by the field of the arrestor coil 68 so that it moves at alternately fast and slow velocities. The wiping wave is continually applied through mixer 69 to the grid 70 so that a uniform light distribution is produced by the arrested beam. When the video signal includes high frequency components so that the reproduced picture has fine detail, the transponder unit 65 is rendered operative and applies the high amplitude gating wave to mixer 69 so that the intensity of the beam is rendered greater during the periods of slow movement thereof to provide a light distribution having very high peaks to form substantially stationary dots. This has the effect of etching the screen during such signals with the dots providing greatly improved definition and high brightness. However, during times when there is no fine detail in the picture, the dots are wiped out so that the dot structure does not appear to disturb the portions of the picture having solid tone. The delay line 61 delays the video signal applied to the cathode 63 so that the transponder unit has time to operate to provide the etching operation when fine detail is present.

Figure 7:
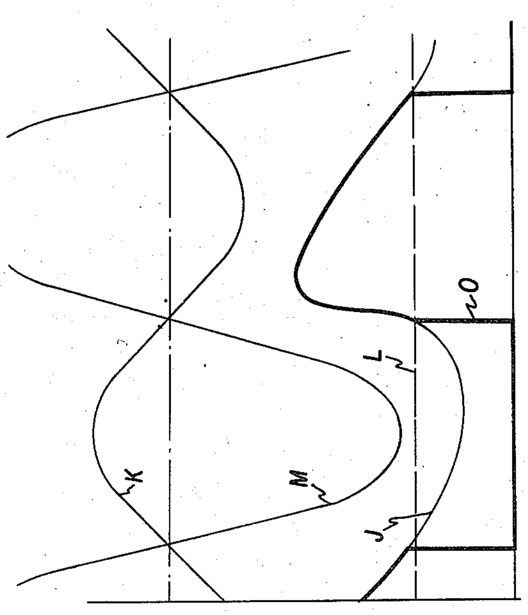
Fig. 7 is a plurality of curves illustrating the operation of the system of Fig. 6.

The operation of the system of Fig. 6 is illustrated by the curves of Fig. 7. Curve J shows the light distribution resulting from the arrested movement of the beam when the dot index is of the order of 4. Curve K is the wiping wave which is applied from the arrestor unit through a mixer to the grid 70 to normally remove the dots from the screen. This results in a light distribution as indicated by the straight line L. Curve M is the etching or gating wave produced by the transponder unit 65 and is of opposite phase and much larger amplitude than the wiping wave K. By providing the etching wave of very large amplitude, it may operate as a square wave to either absolutely cut off the beam or provide full intensity thereof. This therefore results in a light distribution curve as indicated by the heavy line O which is effective to remove the interdot light without decreasing the amplitude of the peaks. This obviously results in a minimum reduction in average light and provides good resolution.

Figures 8, 9:
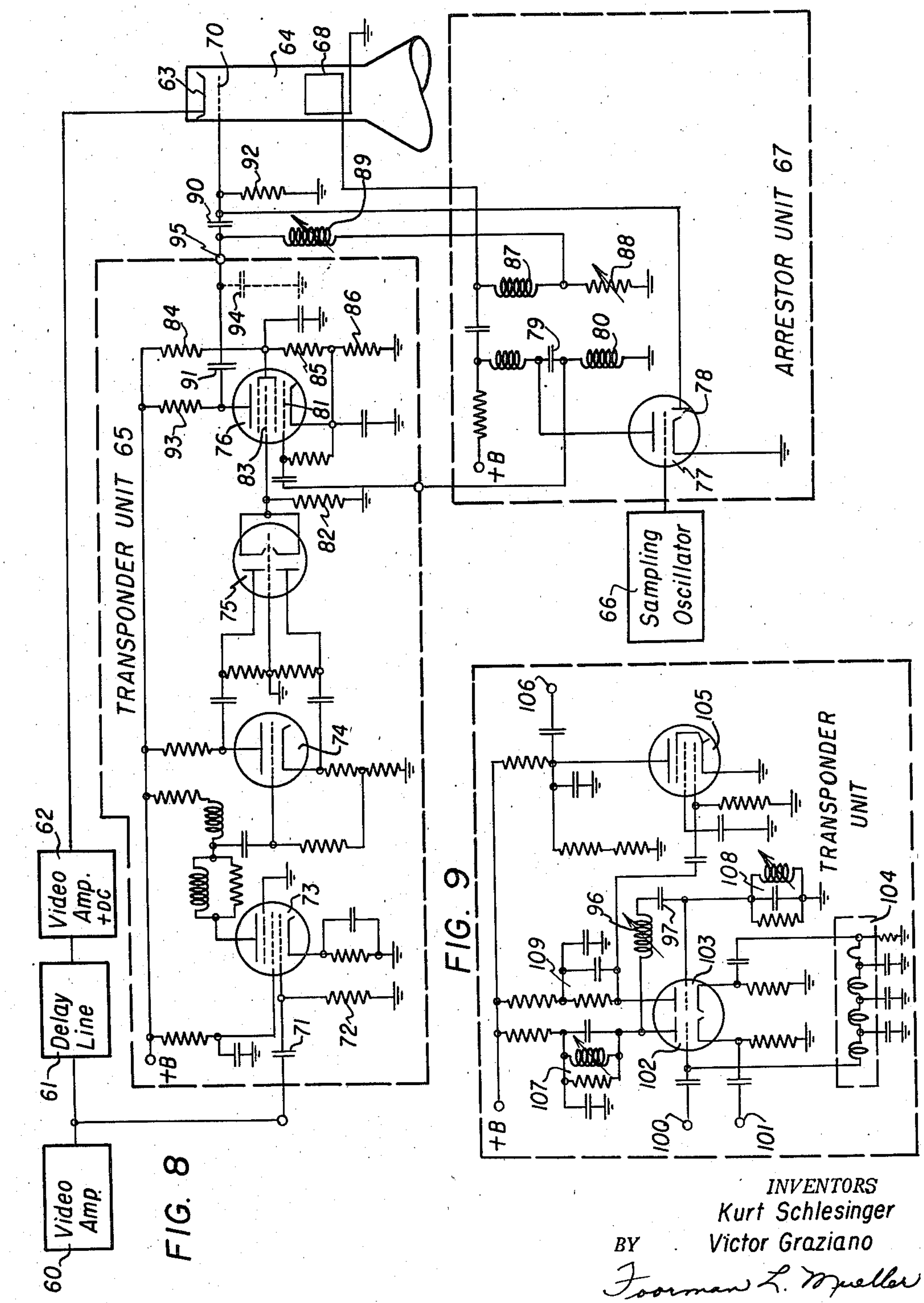
Fig. 8 is a complete circuit diagram of an arrestor unit, transponder unit and mixer which may be used in the system of Fig. 6.
Fig. 9 is a modified circuit which can be used in the system of Fig. 6.

It will be obvious that the system disclosed in Fig. 6 may be provided by various different circuit arrangements. In Figs. 8 and 9 there are disclosed two circuits which may be used for the transponder and arrestor units and the mixer. Considering first Fig. 8, the signal from the video amplifier is applied to the input terminal of the transponder unit 65. The transponder unit includes a high pass selective amplifier stage comprising a high pass filter formed by condenser 71 and resistor 72, and the pentode valve 73. The high pass filter rejects all signals below a particular value which may be of the order of one-half a megacycle and passes signals above this value without substantial attenuation. The output of the amplifier 73 is applied to triode 74 which functions as a phase splitter with the balanced output therefrom being rectified by the balanced diodes 75. It is therefore obvious that when the video output exceeds a predetermined frequency, the signal will be applied by the amplifier 73 to the triode 74 and will be rectified by the diodes 75 to produce a control voltage which is applied to the etching amplifier stage 76.

The sampling oscillator 66 may be of standard construction and is used in the same manner as sampling oscillators previously proposed for use in dot interlace and dot arresting systems. As previously stated this may operate at a frequency of the order of 7.44 megacycles, but this particular frequency is not essential and the invention is not to be limited thereby. The output of the sampling oscillator is applied to the arrestor unit 67 which includes a single triode stage 77. The output stage 77 includes a diode section 78 to be used in a manner to be explained hereinafter. A voltage wave from the arrestor unit 67 is applied to the amplifier 76 of the transponder, being applied through condensers 79 and across inductor 80 to the control grid 81 of the pentode amplifier tube 76. The control voltage from the senser diodes 75 is applied across resistor 82 to the suppressor grid 83 of the pentode 76 to selectively render the same conducting. The screen grid and cathode of the pentode 76 are held at the desired potentials by the voltage divider including resistors 84, 85 and 86.

To provide the continuous wiping wave, inductor 87 and variable resistor 88 are connected in series across the arrestor coil 68. The voltage wave across resistor 88 is applied through the inductor 89 and condenser 90 to the grid 70 of the cathode ray reproducing tube 64. This voltage wave is a negative cosine wave which normally removes the dot structure as is illustrated in curve K of Fig. 7. The gating wave as illustrated by curve M is produced by the amplifier tube 76 when the signal is passed by the amplifier 73 and a control voltage is produced by the diodes 75 across resistor 82. The wave applied to the grid 81 is so phased that the wave at the output of the amplifier 76 will be a positive cosine wave. This wave is applied through coupling condenser 91 and through condenser 90 to the grid 70 of the reproducing tube.

It is therefore apparent that when fine detail is present in the picture, dot structure is produced by joint action of the arresting yoke 68 and the etching wave applied to the grid 70. However, in the absence of fine detail, the etching amplifier 76 is blocked and the dot structure normally produced by the arrestor action is removed by the minus cosine wave applied to the control grid 70. The delay line 61 is designed to cause a delay in the application of the video signal to the cathode 63 which is sufficient to permit operation of the transponder unit 65, so that when fine detail is present in the picture, this will cause the etching action on the screen at the time the video signal producing the fine detail modulates the grid of the tube.

As previously stated, the diode section 78 is for the purpose of holding the peaks of the gating wave at ground potential so that the white in the picture is not changed. In order to accomplish this, the time constant of the condenser 90 and resistor 92, across which the gating signal is applied to the grid 70, must be the same as the time constant provided by the resistor 93 connected to the plate of the tube 76 and the capacity across the output electrodes which may be formed by distributed capacity as indicated at 94. This provides a bias which brings the signal applied to the grid 70 down so that the peaks are at ground and the negative or black portions have double amplitude to thereby increase the gating effect and eliminate interference with the whites in the picture.

In Fig. 9 there is illustrated a second embodiment of the transponder unit which may be used in the systems illustrated in Figs. 6 and 8. This unit operates from the video signal and the sampling wave rather than from the video signal and the arresting wave as the transponder unit 65 of Fig. 8. The video signal is applied to the terminal 100 and the sampling wave to the terminal 101. These waves are applied respectively to the grid and cathode of the triode section 102 wherein they are beat together to provide an output frequency equal to the sampling frequency minus the video frequency. This frequency is selected by the network including tuned circuits 107 and 108 which are interconnected by inductor 96 and capacitor 97. The signal across tuned circuit 108 is applied to the grid of the triode 103. The fundamental frequency of the video signal is applied through delay line 104 to the cathode of the triode 103 wherein the signals are again mixed to produce an output of the sampling frequency only. This frequency is selected by the tuned circuit 109 connected to the plate of the triode 103 and applied therefrom to the limiter 105. The output of the limiter at the terminal 106 provides the gating wave which may be applied in exactly the same manner as the output of the transponder unit 65 at terminal 95 as shown in Fig. 8.

The tuned circuits 107, 108 and 109 select the signals from the mixers so that the output of the transponder unit is at the frequency of the sampling wave when the video signal is within a predetermined band. Actually, it is desired for the transponder unit to provide an output when the video signal is in a frequency range of the order of .5 to 3.5 megacycles. When using a sampling frequency of 7.44 megacycles, the sampling frequency minus the video signal will extend in the range from about 3.9 to 6.9 megacycles. Therefore tuned circuits 107 and 108 must respond only to this frequency range. Tuned circuit 109 is merely for the purpose of rejecting the output of the triode mixer 103 which is equal to the sampling frequency minus two times the video frequency and therefore this tuned circuit need not be too critical. It is therefore apparent that by use of the circuit of Fig. 9 the transponder unit may be provided in a very simple form including only a double triode and a limiter stage. It may be possible in some applications to eliminate the limiter stage by careful design of the remainder of the circuit.

The dot arresting system in accordance with the invention is not limited to operations in which waves of sinusoidal form are used for arresting and gating, but is also applicable to operation with waves of other forms. It will be apparent that by the use of an arrestor wave of sawtooth wave form, the dots can be absolutely stopped in position for a relatively long time depending upon the duty cycle of the sawtooth wave. Although the provision of a sawtooth wave at the high frequency used for arresting is difficult, a wave having generally sawtooth wave form may be provided by the combination of a fundamental sine wave and a second harmonic thereof. It has been found that the use of such a wave, in which the second harmonic has an amplitude one-third that of the fundamental, provides a wave approximating a sawtooth and having a duty cycle of something more than 60%. This wave has been designated type 21 and is illustrated in Fig. 10 in which the fundamental sine wave component is illustrated by the curve P, the second harmonic by the curve Q, and the composite wave by the curve R.

The movement of the beam in response to the arresting wave R together with the linear deflection field A, is shown by the curve S. It is apparent that the wave S has a substantially flat portion of long duration which indicates that the beam will remain at rest for a relatively long period of time. This results in a light distribution due to the velocity modulation of the beam such as indicated by the curve T. Because of the fact that the beam is absolutely at rest, and remains at rest for a relatively long period of time, the definition and brightness are increased.

Figure 10:
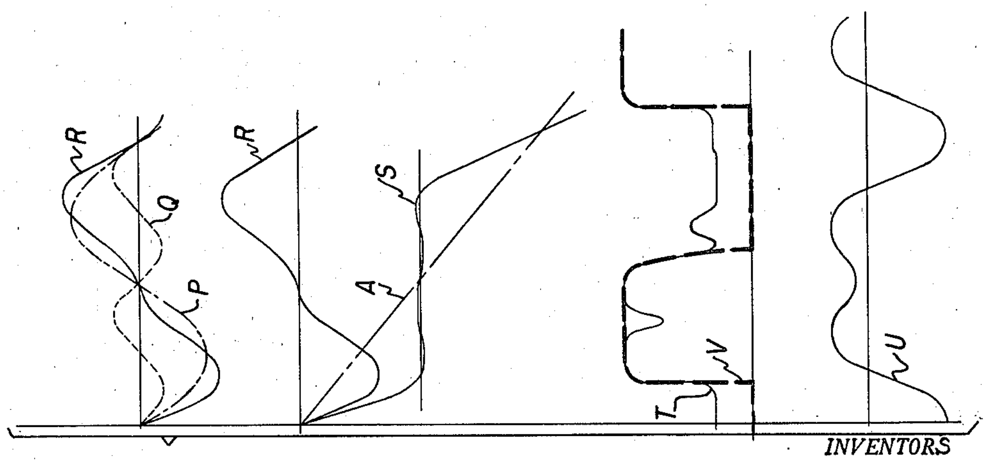
Fig. 10 is a set of curves illustrating a second embodiment of the invention.

The resolution of the dots in the system illustrated by the curves of Fig. 10 can be increased by gating the beam by the voltage wave which is required to produce the current wave R in the arrestor coil. Such a voltage wave is indicated by the curve U of Fig. 10, and this wave may be applied to the tube for gating the same to provide a light distribution such as indicated by the curve V. It is apparent that the curve V has the same maximum amplitude and therefore the same brightness as the curve T but the inter dot light is substantially removed since the beam is blanked between dots to thereby increase the resolution of the dots and the picture definition.

Figure 11:
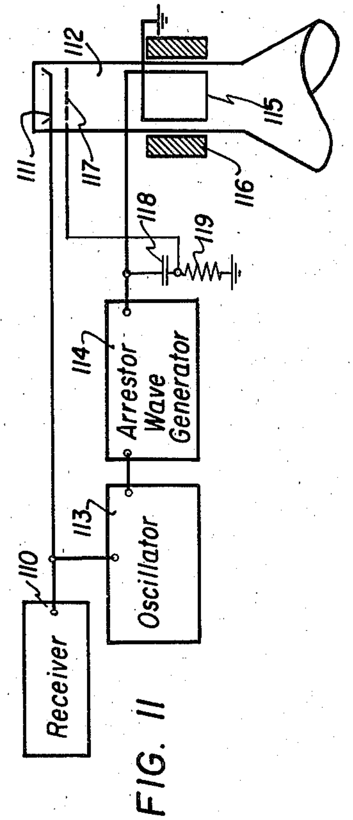
Fig. 11 is a simplified schematic diagram illustrating the second embodiment of the invention.

In Fig. 11 there is illustrated a simple schematic diagram illustrating a system which provides operation as illustrated in Fig. 10. This system includes a receiver 110 for providing a video signal to the grid 111 of the reproducing tube 112. As previously stated, the system operates from a signal having a third element of synchronization which is provided by a sampling frequency, and an oscillator 113 is provided which may be synchronized with the sampling frequency. Although the oscillator may operate at any one of various different frequencies which do not interfere with the television system, it is proposed that the oscillator may operate at a frequency of 7.44 megacycles and be synchronized with a sampling wave of 3.72 megacycles. The oscillator 113 drives the arrestor wave generator 114 which produces a sawtooth wave as illustrated by curve R in Fig. 10. A circuit for providing such a wave will be described hereinafter. The output wave of the generator 114 is applied to arrestor yoke 115 which is positioned along the tube neck in the same position as the regular deflection yoke 116. This results in the arresting wave being combined with the regular linear deflection wave as illustrated in Fig. 10.

If it is desired to gate the beam to remove the inter dot light as indicated by curve V of Fig. 10, a circuit may be provided for applying the voltage at the output of the arrestor wave generator 114 to the grid 117 of the picture reproducing tube. This is accomplished by the use of a circuit including condenser 118 and resistor 119 connected in series, with the voltage across resistor 119 being applied to the grid 117. It is to be noted that this circuit arrangement for providing the gating voltage wave is merely illustrative and other circuit arrangements may be used.

Figure 12:
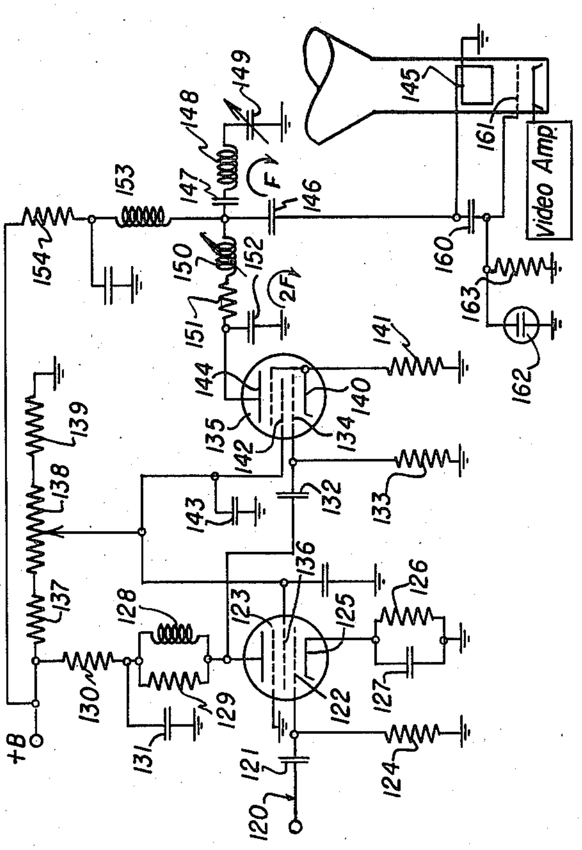
Fig. 12 is a circuit diagram of an arrestor wave generator for use in the second embodiment.

In Fig. 12 there is illustrated one embodiment of an arrestor wave generator for producing the type 21 arresting wave which is of generally sawtooth form as has been described. In the circuit of Fig. 12, the sine wave from the sampling oscillator is applied at the terminal 120 and through condenser 121 to the grid 122 of the pentode tube 123. Resistor 124 provides bias to the grid 122. The cathode 125 of the tube is connected to ground through resistor 126 bypassed by condenser 127. The plate of the triode driver stage is connected through coil 128 and resistor 129 in parallel and dropping resistor 130 to plus B potential. Condenser 131 provides high frequency bypass. The output of the driver stage is applied through condenser 132 and across resistor 133 to the grid 134 of the pentode output stage 135 which provides shock exciting pulses. The screen grid 136 of the tube 123 is connected to a voltage divider network including resistors 137, 138 and 139 connected in series. Resistor 138 has an adjustable top connected to the screen grid 136 to control the amplification of the driver stage 123.

The output stage 135 has a cathode 140 connected to ground through resistor 141 and a screen grid 142 connected to the tap on resistor 138 of the voltage divider. By changing the position of the movable tap on potentiometer 138, the voltage applied to the screen grid 142 can be adjusted to adjust the cut off level in this stage. Condenser 143 provides a bypass for the screens. The plate 144 of the output stage 135 is connected to a network including two sections resonant respectively at the fundamental and second harmonic of the sampling frequency. The network section including the arrestor yoke 145, condenser 146, condenser 147, inductance 148, and variable condenser 149, is series resonant at the fundamental frequency to provide this frequency through the arrestor yoke. The frequency of this circuit can be adjusted by the variable condenser 149. The network section including the arrestor yoke 145, condenser 146, inductance 150, resistor 151, and condenser 152 is resonant at the second harmonic to provide this component in the yoke. In this circuit the inductor 150 is variable to adjust the frequency. Resistor 151 is provided to damp the second harmonic independently of the fundamental. Inductor 153 and resistor 154 provide plate potential to the output stage.

Considering now the operation of the circuit of Fig. 12, the two resonant circuits are shock excited by the pentode tube 135, and in order to obtain the desired components of fundamental and second harmonic, the voltage applied to the screen 142 is adjusted so that the pentode is cut off and the output thereof is a pulse formed by the peak of the sine wave. The tube is cut off by grid current and the cutoff point may be accurately controlled by adjusting the screen voltage. The adjustable tap on resistor 138 applies variable potential both to the screen grid of the driver stage 123 and to the screen grid of the output stage so that the amplitude of the wave applied from the driver to the output stage and also the cut off level of the output stage are controlled thereby. As the clipping level and the amplitude are adjusted in a corresponding manner, the amplitude of the shock exciting pulse can be changed without changing the shape thereof and the wave form of the type 21 sawtooth wave will remain the same for various amplitudes of the wave.

In order to provide gating of the beam of the tube to remove the interdot light as illustrated in the curve V of Fig. 10, a gating wave may be provided by applying the voltage across the arrestor coil 145 through condenser 160 to the grid 161 of the picture tube. The diode 162 and resistor 163 hold the peaks of the gating voltage at ground potential as in the systems previously described. By thus limiting the interdot light, the contrast available in the dots is increased to increase the resolution thereof and make for better picture definition.

The operation of the arrested scanning systems have been carefully analyzed and it has been found that the peak brightness of the beam is considerably improved by the dot arresting system. Although gating of the beam tends to reduce the brightness somewhat, when the gating wave is overdriven as indicated by the curves of Fig. 7, the peak brightness is not reduced thereby. Gains in peak brightness of the order of 4 to 10 decibels can be obtained, with the gain depending upon the dot index and being greater for higher indices. When using sawtooth arresting waves, still greater gains may be produced. Although the high frequency resolving power, that is the contrast in reproductions having fine detail, is somewhat reduced by the dot arresting technique, this can be minimized by gating, and especially when using gated sawtooth arresting the loss is very small. This can also be compensated for by providing an increased response in the transmitter at the high frequency end of the frequency band. Although the resolving power may be somewhat less than with standard linear scan, it is to be pointed out that the picture sharpness is much greater because of the fact that individual dots are provided so that sharp definition may be produced.

Numerous variations can be made in the systems disclosed within the scope of the invention. The invention is directly applicable to systems using electrostatic deflection and generators for providing the exciting voltage waves are well known in the art. Gating of the beam of the tube can be provided by applying the gating voltage wave to the cathode of the picture reproducing tube instead of to the grid. In such case, the phase of the wave must obviously be reversed. Wiping of the dots while signals are received with no high frequency components can be accomplished by keying the arrestor unit off or on instead of using a wiping wave at the grid. Transponder units as disclosed herein could be used to provide such keying operation.

As previously stated, the invention is applicable to both monochrome and color television systems. In color systems using a tube having a plurality of beams, the arresting may be individually applied to the beams to thereby eliminate the samplers. Electrostatic arresting fields may be provided as is shown in my application Serial No. 189,731, referred to above. In systems in which dots of various colors are displayed in sequence, dots of the various colors may be displayed during one period of the arrested movement to thereby provide group arresting. Applications of the system to various different monochrome and color television systems will be obvious to those skilled in the art.

It will be apparent from the foregoing that improved methods and systems for dot arresting scanning are provided which are effective to increase both the brightness and definition of a reproduced television picture. In systems in which waves of sinusoidal form are used for arresting and gating, the equipment required is very simple. By the use in this system of a wiping wave, the dot structure can be removed, and the control of the gating and wiping by the characteristics of the video signal permits the reproduction of a picture, with the parts in fine detail shown by dots and the parts having only coarse detail shown by continuous line structure. Since in the sinusoidal systems the wiping wave is of the same wave form and 180° out of phase with respect to the etching or gating wave, it is possible to develop these various waves in a simple circuit. Further, it is possible to have the wiping wave operating continuously and to selectively apply an etching wave of twice the amplitude of the wiping wave so that the two waves are mixed to provide a wave of the same amplitude and in opposite phase to the wiping wave which results in the etching effect.

By using the principles outlined, an arresting wave having substantially sawtooth wave form can be provided by a very simple circuit, and this wave is effective to completely stop the movement of the beam for a relatively long time interval so that a very bright dot is produced. In such a system, the beam can be gated to remove the inter dot light to thereby increase the resolution. As previously stated, the systems can operate with or without gating, and with or without wiping of the dots, and various combinations of these various principles can be applied as will be obvious to those skilled in the art. The various advantages of each of these systems can therefore be obtained as may be most suitable in particular applications.

Although certain embodiments of the invention have been disclosed which are illustrative thereof, it is obvious that various changes and modifications can be made therein within the intended scope of the invention as defined in the appended claims.

We claim:

1. In a television system having a cathode ray tube including a screen and means for producing an electron beam which impinges the screen, and having electrode means for controlling the intensity of the beam, the combination including, means for applying a video signal to said electrode means for controlling the intensity of the beam, means for deflecting said beam across said screen providing a field having a first sawtooth component of a first fixed frequency with substantially linear trace portions and a second component alternating at a second fixed frequency substantially greater than said first frequency, so that the alternations of said second component reinforce and oppose said first component during said linear trace portions and said components together cause each trace of said beam to alternately include movement at fast and slow rates, and gating means connected to said electrode means and providing voltage waves for varying the intensity of said beam, said gating means including portions providing first and second fixed frequency voltage waves of said second frequency with said first and second fixed frequency voltage waves having opposite phases with respect to each other, with said first voltage wave decreasing the intensity of said beam during movement thereof at said slow rate to counteract the effect of said second component of said deflecting means and to thereby produce traces having substantially constant apparent intensity, and said second voltage wave increasing the intensity of said beam during movement thereof at said slow rate to reproduce traces formed of substantially stationary spaced dots, said gating means also including a control portion for selectively applying said first and second voltage waves to said electrode means at the same time the video signal is applied thereto, said control portion having a first condition for applying said voltage waves so that said first voltage wave predominates to provide traces having substantially constant apparent intensity, and a second condition for applying said voltage waves so that said second voltage wave predominates to provide traces formed of substantially stationary spaced dots.

2. A system in accordance with claim 1 wherein said gating means includes sensing means responsive to high frequency components of the video signal for operating said control portion to said first condition in the absence of such high frequency components and for operating said control portion to said second condition in response to such high frequency components.

3. In a television system including a cathode ray tube having means for producing an electron beam which impinges a screen with at least two electrodes for controlling the intensity of the beam, and means for applying a video signal to one of said electrodes, the combination including, means for deflecting said beam across said screen providing a field having a first sawtooth component of a first fixed frequency with substantially linear trace portions and a second component alternating at a second fixed frequency substantially greater than said first frequency, so that the alternations of said second component reinforce and oppose said first component during said linear trace portions thereof and said components together cause movement of said beam at alternately fast and slow rates, means connected to the other of said electrodes for providing thereto voltage waves for varying the intensity of said beam, said voltage providing means including a first portion for continuously producing a first voltage wave of said second fixed frequency and of such phase to decrease the intensity of said beam during movement thereof at said slow rate to counteract the effect of said alternating component of said deflecting wave, and a second portion for providing a second voltage wave of said second fixed frequency and of opposite phase to said first voltage wave to increase the intensity of said beam during movement thereof at said slow rate whereby substantially stationary dots are produced on said screen, said second voltage wave having an amplitude at least twice that of said first voltage wave whereby simultaneous application of said waves causes said second wave to override said first wave, and means for causing the application of said second voltage wave to said other electrode only in response to a video signal having high frequency components.

4. In a television system including a cathode ray tube having means for producing an electron beam which impinges a screen with at least two electrodes for controlling the intensity of the beam, and means for applying a video signal to one of said electrodes, the combination, including, means for deflecting said beam across said screen including a first portion for producing a field having sawtooth variations at a first fixed frequency and a second portion for producing an arresting field having alternating variations at a second fixed frequency much higher than said first frequency, with said first and second portions causing movement of said beam at alternately fast and slow rates, said second portion including a coil and means for producing a current wave in said coil, a circuit connected to said coil for continuously providing a first voltage wave of said second fixed frequency to said other electrode which is of such phase to decrease the intensity of said beam during movement thereof at said slow rate to counteract the effect of said arresting field, and generator means connected to said other electrode for providing a second voltage wave of said second fixed frequency and of opposite phase to said first voltage wave to increase the intensity of said beam during movement thereof at said slow rate whereby substantially stationary dots are produced on said screen, said second voltage wave having an amplitude at least twice that of said first voltage wave whereby simultaneous application of said waves causes said second wave to override said first wave, said generator means including sensing means responsive to high frequency components of said video signal for applying said second voltage wave to said other electrode only when said video signal includes high frequency components.

5. In a television system including a cathode ray tube having means for producing an electron beam which impinges a screen, with at least two electrodes for controlling the intensity of the beam, the combination including, means for receiving a video signal including a sampling component, means for applying said video signal to one of said electrodes, means for deflecting said beam across said screen including a first portion for producing a field having sawtooth variations at a first fixed frequency and a second portion for producing an arresting field having alternating variations at a second fixed frequency much greater than said first frequency, with said first and second portions causing movement of said beam at alternately fast and slow rates, said second portion including a coil and means for producing an alternating current in said coil, oscillator means controlled by said sampling component of said video signal for developing a sampling wave, means for synchronizing said alternating current producing means with said sampling wave, a circuit connected to said coil for continuously applying the voltage wave thereacross to said other electrode as a first voltage wave of said second fixed frequency which is of such phase to decrease the intensity of said beam during movement thereof at said slow rate to counteract the effect of said alternating component of said deflecting wave, and generator means connected to said other electrode for providing a second voltage wave of said second fixed frequency and of opposite phase to said first voltage wave to increase the intensity of said beam during movement thereof at said slow rate whereby substantially stationary dots are produced on said screen, means for applying said video signal and said sampling wave to said generator means, said generator means being operative only when said video signal bears a predetermined relation to said sampling wave to produce said second voltage wave having an amplitude at least twice that of said first voltage wave which overrides said first voltage wave.

6. In a television system including a cathode ray tube having means for producing an electron beam which impinges a screen with electrode means for controlling the intensity of the beam, the combination, including, means for receiving a video signal including a sampling component, means for applying said video signal to said electrode means, means for deflecting said beam across said screen including a first portion for producing a field having sawtooth variations at a first fixed frequency and a second portion for producing an arresting field having alternating variations at a second fixed frequency much greater than said first frequency, with said first and second portions causing movement of said beam at alternately fast and slow rates, said second portion including a coil and means for producing an alternating current in said coil, means for synchronizing said alternating current producing means with said sampling component, a circuit connected to said coil for continuously applying the voltage wave thereacross to said electrode means as a first voltage wave of said second fixed frequency which is of such phase to decrease the intensity of said beam during movement thereof at said slow rate to counteract the effect of said alternating component of said deflecting wave, and generator means connected to said electrode means for providing a second voltage wave of said second fixed frequency and of opposite phase to said first voltage wave to increase the intensity of said beam during movement thereof at said slow rate whereby substantially stationary dots are produced on said screen, said generator means being controlled by said sampling component and said second voltage wave produced thereby having the same frequency as said alternating component and having an amplitude at least twice that of said first voltage wave whereby simultaneous application of said waves causes said second wave to override said first wave, said generator means including sensing means responsive to high frequency components of said video signal for applying said second voltage wave to said electrode means only when said video signal includes high frequency components.

References Cited in the file of this patent

UNITED STATES PATENTS

| | | |
|---|---|---|
| 2,034,704 | Nakashima et al. | Mar. 24, 1936 |
| 2,093,157 | Nakashima et al. | Sept. 14, 1937 |
| 2,143,933 | Barthelemy | Jan. 17, 1939 |
| 2,227,630 | Carnahan | Jan. 7, 1941 |
| 2,250,819 | Wolf | July 29, 1941 |
| 2,411,963 | George | Dec. 3, 1946 |
| 2,439,321 | Starr | Apr. 6, 1948 |
| 2,465,355 | Cook | Mar. 29, 1949 |
| 2,479,880 | Toulon | Aug. 23, 1949 |
| 2,619,612 | Lawrence | Nov. 25, 1952 |
| 2,623,196 | Toulon | Dec. 23, 1952 |
| 2,678,349 | Forbes | May 11, 1954 |
| 2,678,964 | Loughlin | May 18, 1954 |